United States Patent
So et al.

(10) Patent No.: US 7,773,966 B2
(45) Date of Patent: Aug. 10, 2010

(54) MOBILE TERMINAL AND METHOD OF REDUCING INTERFERING PHASE-NOISE IN THE MOBILE TERMINAL

(75) Inventors: Won Wook So, Gyunggi-do (KR); Hak Sun Kim, Daejeon (KR); Won Tae Choi, Gyunggi-do (KR); Young Kyu Park, Gyunggi-do (KR); Joo Yul Ko, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 574 days.

(21) Appl. No.: 11/747,533

(22) Filed: May 11, 2007

(65) Prior Publication Data

US 2007/0268857 A1 Nov. 22, 2007

(30) Foreign Application Priority Data

May 16, 2006 (KR) .................. 10-2006-0043872

(51) Int. Cl.
*H04B 1/18* (2006.01)
*H04K 3/00* (2006.01)

(52) U.S. Cl. .................. 455/284; 455/295; 455/296; 455/552.1

(58) Field of Classification Search ............. 455/114.2, 455/283–284, 295–296, 552.1–553.1
See application file for complete search history.

(56) References Cited

U.S. PATENT DOCUMENTS

| 6,229,359 | B1 | 5/2001 | Chesavage |
| 6,510,308 | B1 | 1/2003 | Thomas et al. |
| 6,567,649 | B2 | 5/2003 | Souissi |
| 6,961,019 | B1 | 11/2005 | McConnell et al. |
| 7,366,244 | B2 * | 4/2008 | Gebara et al. ............... 375/259 |
| 7,546,107 | B2 * | 6/2009 | Noda et al. ................. 455/296 |
| 2005/0226353 | A1 | 10/2005 | Gebara et al. |

FOREIGN PATENT DOCUMENTS

| JP | 07-030459 A | 1/1995 |
| JP | 09-312587 A | 12/1997 |
| JP | 11-308143 A | 11/1999 |
| JP | 2003-507954 A | 2/2003 |

* cited by examiner

*Primary Examiner*—Lee Nguyen
(74) *Attorney, Agent, or Firm*—Lowe Hauptman Ham & Berner LLP (57) ABSTRACT

A mobile terminal capable of breaking a phase-noise signal caused by a high power transmission signal of a mobile phone such as GSM when receiving digital TV broadcasting such as DVB-H and a method of reducing interfering phase-noise in the mobile terminal. The mobile terminal includes a first RF transmitter/receiver; a first signal coupler; a phase-noise filter; a phase shifter; a VGA amplifier; and a signal combiner.

12 Claims, 9 Drawing Sheets

PRIOR ART

FIG. 2

PRIOR ART

MOBILE TERMINAL AND METHOD OF REDUCING INTERFERING PHASE-NOISE IN THE MOBILE TERMINAL

CLAIM OF PRIORITY

This application claims the benefit of Korean Patent Application No. 2006-43872 filed on May 16, 2006, in the Korean Intellectual Property Office, the disclosure of which is incorporated herein by reference.

BACKGROUND OF THE INVENTION

1. Field of the Invention

The present invention relates to a mobile terminal capable of receiving digital TV broadcast, and more particularly, to a mobile terminal breaking a phase-noise signal caused by a high power transmission signal of a mobile phone such as GSM when receiving digital TV broadcasting such as DVB-H, preventing deterioration of sensitivity of receiving of digital TV broadcast, which is caused by a phase-noise signal of a high power GSM signal, and improving reception performance of digital TV broadcasting such as DVB-H and mass productivity and a method of reducing interfering phase-noise.

2. Description of the Related Art

In general, recently there has been a lot of interest in digital TV broadcasting and therefore technologies have been developed, such as digital multimedia broadcasting (DMB) in Korea and digital video broadcasting (DVB) in Europe.

In DMB, there are terrestrial DMB and satellite. In DVB, there are DVB-T receiving broadcast from general broadcasting companies by a fixed device for home or office and DVB-H capable of using low power and having mobility and portability for a mobile phone or portable video device.

As mobile terminals corresponding to mobile communication terminals such as mobile phones and PDAs have been composed, a mobile phone including DVB-H will come out. In this case, when one terminal supports two or more functions such as GSM, GPRS and DVB-H, receiving sensitivity of each module is deteriorated by mutual interference. Accordingly, there is required proper solution for the deterioration of receiving sensitivity of each module, which is caused by the mutual interference.

Figure 1:
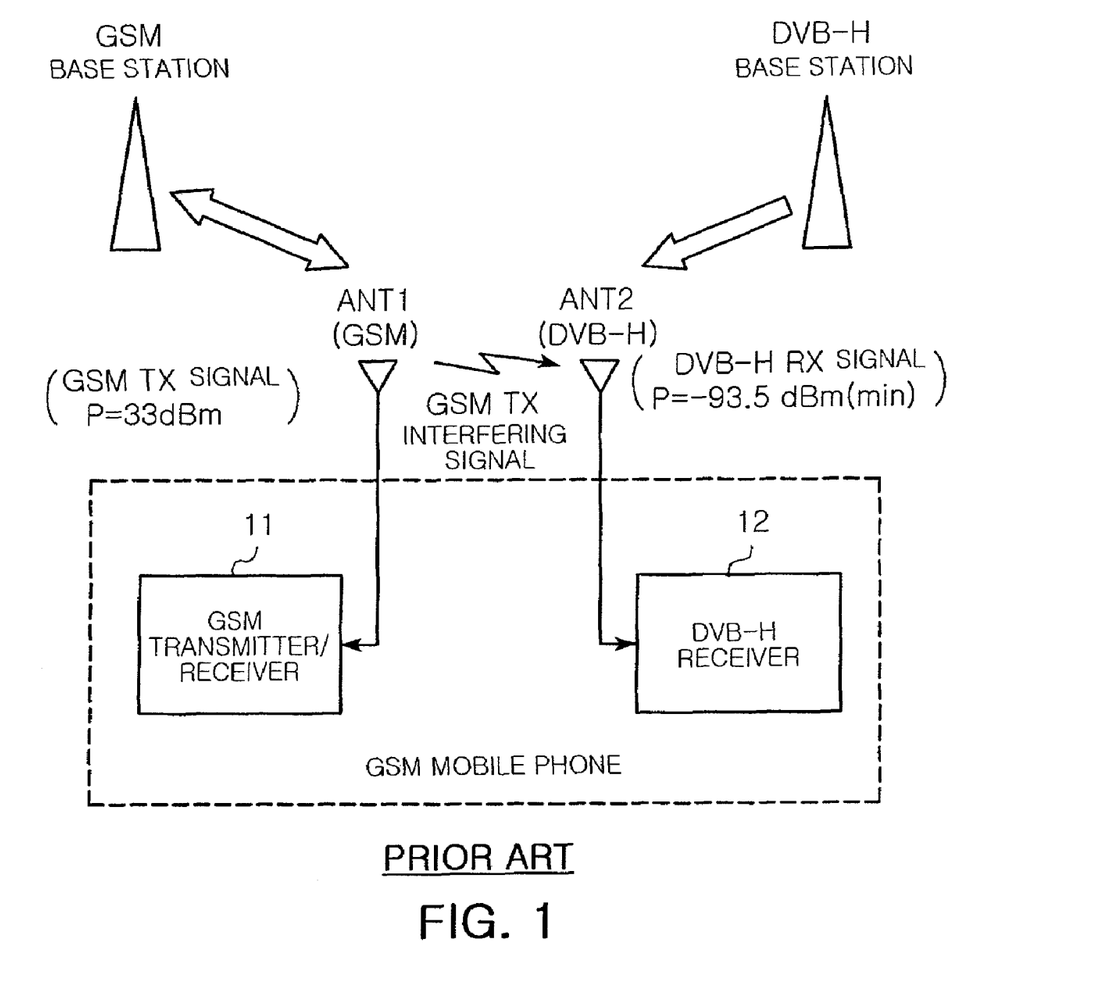
FIG. 1 is a configuration diagram of a conventional GSM mobile terminal including a DVB-H receiver.

FIG. 1 is a configuration diagram illustrating a conventional GSM mobile phone including a DVB-H receiver. Referring to FIG. 1, the conventional GSM mobile phone includes a GSM transmitter/receiver 11 transmitting and receiving a GSM signal of approximately 900 MHz in which TX corresponds to 880 to 915 MHz and RX corresponds to 925 to 960 MHz and a DVB-H receiver 12 receiving a DVB-H broadcasting signal having a band of approximately 470 to 750 MHz.

Figure 2:
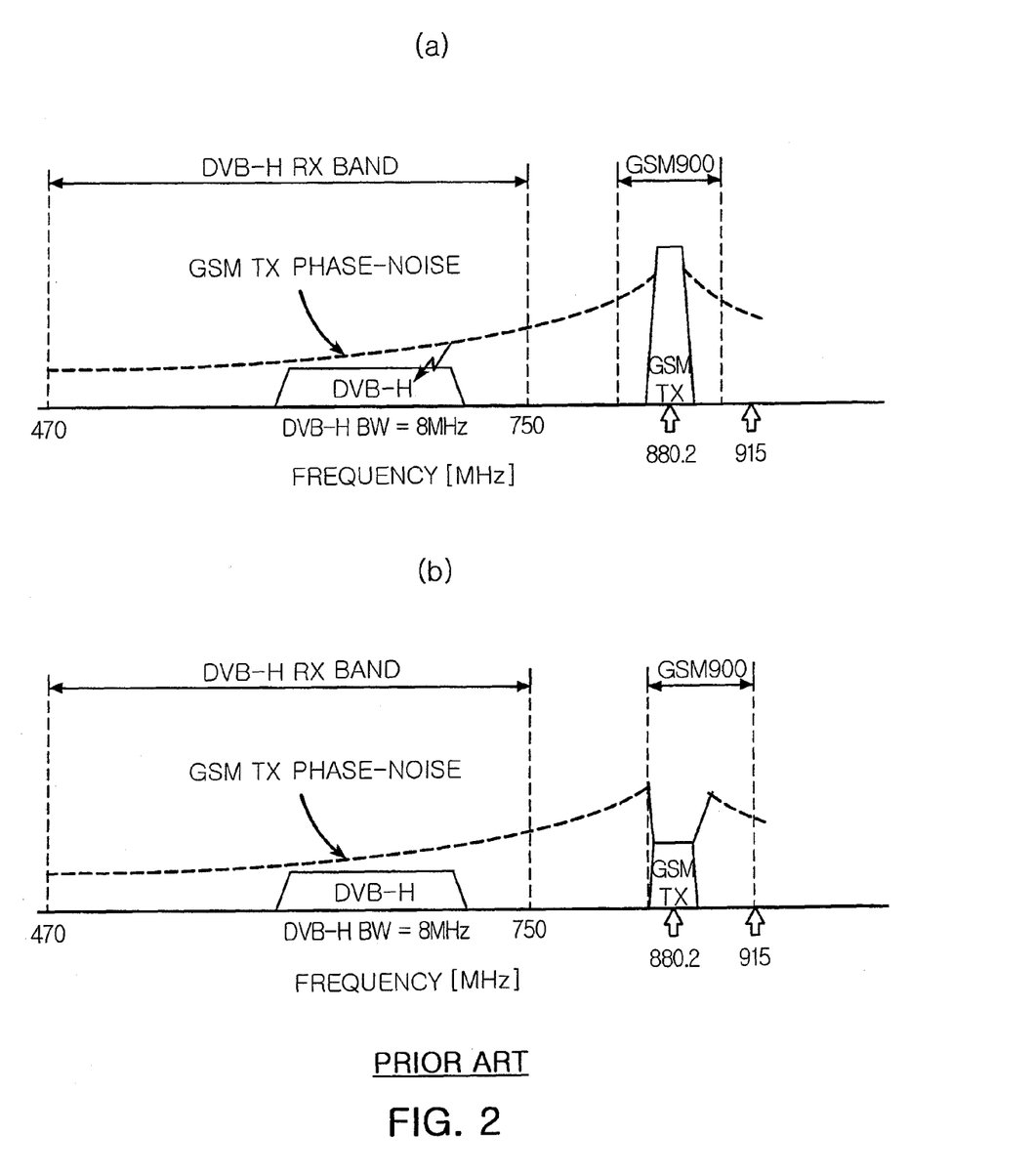
FIGS. 2A and 2B are diagrams illustrating a phase-noise effect of conventional mobile terminal.

In FIGS. 2A and 2B, there are illustrated effects of phase-noise of a GSM900 transmission band corresponding to approximately 900 MHz for a DVB-H reception band in a conventional mobile terminal.

FIGS. 2A and 2B are diagrams illustrating a of phase-noise effect of a GSM900 transmission band for a DVB-H reception band. Referring to FIG. 2A, there is illustrated a phase-noise effect of the GSM900 transmission band for the DVB-H reception band when there is not included a band pass filter removing the GSM900 transmission band in an input port of the DVB-H receiver 12. Referring to FIG. 2B, there is illustrated a phase-noise effect of the GSM900 transmission band for the DVB-H reception band when there is included the band pass filter in the input port of the DVB-H receiver 12.

Referring to FIG. 2A, the DVB-H band corresponds to approximately 470 to 750 MHz and the GSM900 transmission band corresponds to approximately 880 to 915 MHz. In FIGS. 2A and 2B, a phase-noise signal of a GSM transmission signal flows into the DVB-H reception band and has a bad effect on a DVB-H reception signal.

On the other hand, in conventional mobile terminal, while receiving digital broadcasting via the DVB-H receiver 12, GSM transmission/reception may be performed via the GSM transmitter/receiver 11. Also, while receiving digital broadcasting via the DVB-H receiver 12, the GSM transmission/reception may be performed via another near GSM transmitter/receiver.

Referring to FIG. 2B, since power of the GSM transmission signal is amplified high to approximately 33 dBm via a built-in power amplifier in the GSM transmitter/receiver 11, the GSM transmission signal of high power may flow into the DVB-H receiver 12 via an antenna. In this case, since the GSM transmission signal acts as noise to the DVB-H broadcasting signal, a band pass filter (BPF) may be included in the input port of the DVB-H receiver 12 in order to reduce the noise. The BPF allows a DVB-H reception signal of approximately 470 to 750 MHz to pass and breaks a GSM transmission signal more than 880 MHz.

The BPF included in the DVB-H receiver 12 of the conventional GSM mobile phone may improve noise caused by intermodulation between the GSM transmission signal and a DVB-T signal, generated in an RF circuit of the DVB-H receiver 12, by breaking the GSM transmission signal.

However, in the conventional GSM mobile phone, though including the BPF, a phase-noise component of a GSM transmission signal in a band of 470 to 750 MHz is not broken, passes the BPF without reduction, and has a bad effect on the DVB-H reception band to deteriorate receiving sensitivity of the DVB-H broadcasting.

Figure 3:
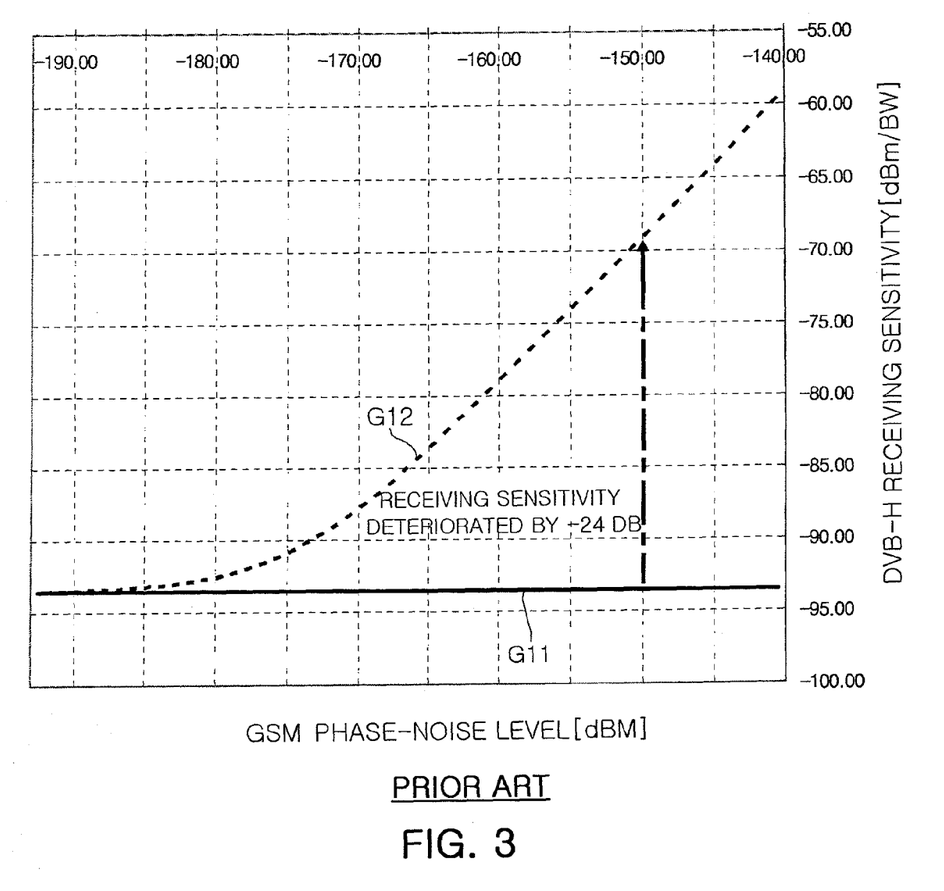
FIG. 3 is a measurement graph illustrating receiving sensitivity of DVB-H against phase-noise in a conventional GSM mobile terminal.

FIG. 3 is a measurement graph illustrating receiving sensitivity of DVB-H against phase-noise in a conventional GSM mobile terminal. Referring to FIG. 3, when a GSM transmission signal flows into the DVB-H receiver 12 via a second antenna ANT2 and phase-noise of the GSM transmission signal has a bad effect on a DVB-H reception band, deterioration of the receiving sensitivity of DVB-H is illustrated according to a level of the phase-noise of the GSM transmission signal.

Referring to FIG. 3, when the level of the phase-noise of the GSM transmission signal flowing via the second antenna ANT2 corresponds to −150 dBm/Hz, the receiving sensitivity of the DVB-H receiver 12 is deteriorated by −24 dB from −93.5 dBm G11 when there is no GSM phase-noise, to −69.5 dBm G12.

Namely, since the reduction of the GSM transmission signal is not high when using the BPF, the conventional GSM mobile phone has a problem of the deterioration of the receiving sensitivity of the DVB-H broadcasting, caused by flow of a transmission signal into the DVB-H receiver 12 as noise.

SUMMARY OF THE INVENTION

The present invention has been made to solve the foregoing problems of the prior art and therefore an aspect of the present invention is to provide a mobile terminal breaking a phase-noise signal caused by a high power transmission signal of a mobile phone such as GSM when receiving digital TV broadcasting such as DVB-H, preventing deterioration of sensitivity of receiving of digital TV broadcasting, which is caused by a phase-noise signal of a high power GSM signal, and improving reception performance of digital TV broadcasting such as DVB-H and mass productivity and a method of reducing interfering phase-noise.

According to an aspect of the invention, there is provided a mobile terminal including: a first RF transmitter/receiver transmitting and receiving a first RF signal via a first antenna; a first signal coupler extracting a low power signal from a signal outputted from the first transmitter/receiver; a phase-noise filter through which a phase-noise signal of the first RF signal corresponding to a second RF receiving band from the signals extracted by the first signal coupler; a phase shifter inverting a phase of the phase-noise signal of the first RF signal from the phase-noise filter; a VGA amplifier modulating a level of a signal from the phase shifter; and a signal combiner combining a signal from the VGA amplifier with a second RF signal from the second antenna and reducing the phase-noise signal of the first RF signal included in the second RF signal.

The mobile terminal may further include a noise reduction controller controlling reduction of the phase-noise signal included in the second RF signal based on a control signal from the second RF receiver.

The noise reduction controller may receive the control signal from the second RF receiver and control variableness of main frequencies of the phase-noise filter and the phase shifter based on channel information included in the control signal.

The noise reduction controller may receive a control signal from the second RF receiver and control variableness of a main frequency of the phase shifter and a gain of the VGA amplifier based on bit error rate of the control signal.

The noise reduction controller may receive the control signal from the second RF receiver, control variableness of main frequencies of the phase-noise filter and the phase shifter and a gain of the VGA amplifier based on channel information and bit error rate of the control signal, and control power of the phase-noise signal of the first RF signal via the second antenna to be decreased.

The phase-noise filter may be formed of a variable filter setting up a pass band including a frequency of a selected channel of the second RF signal as a main frequency under the control of the noise reduction controller.

The phase shifter may set up a main frequency of phase shift and shift a phase of the phase-noise signal from the phase-noise filter on the set main frequency under the control of the noise reduction controller, in which there is a phase difference of 180 degrees between the inverted phase and the phase-noise signal received via the second antenna.

The VGA amplifier may control a level of a signal from the phase shifter to be identical with a level of the phase-noise signal of the first RF signal via the second antenna under the control of the noise reduction controller.

The mobile terminal may further include: a second signal coupler extracting a low power signal from a signal outputted from the signal combiner; and a power detector detecting power of a phase-noise signal included in the signal extracted by the second signal coupler and outputting a detection signal to the noise reduction controller.

The noise reduction controller may monitor power of the phase-noise signal of the first RF signal by using the detection signal from the power detector, change a phase of the phase shifter, controls a gain of the VGA amplifier, and control the power of the phase-noise signal to be decreased.

The mobile terminal may further include an input filter passing a phase-noise signal of the first RF signal and the second RF signal from the second antenna and breaking a first RF transmission signal included in the second RF signal from the second antenna.

According to another aspect of the present invention, there is provided a method of reducing interfering phase-noise, applied to a mobile terminal including a first RF transmitter/receiver transmitting and receiving a first RF signal via a first antenna, a second RF receiver receiving a second RF signal via a second antenna, and a phase-noise reduction apparatus reducing phase-noise included in the second RF signal by using the first RF signal, the method including: operating the second RF receiver and the phase-noise reduction apparatus and setting up a phase-noise filter, a phase shifter, and VGA amplifier, included in the phase-noise reduction apparatus, as a default value; and controlling each main frequency of the phase-noise filter and the phase shifter by using channel information from the second RF receiver and reducing a phase-noise signal included in the second RF signal by using a signal included of the first RF signal, whose phase is inverted.

According to still another aspect of the present invention, there is provided a method of reducing interfering phase-noise, applied to a mobile terminal including a first RF transmitter/receiver transmitting and receiving a first RF signal via a first antenna, a second RF receiver receiving a second RF signal via a second antenna, and a phase-noise reduction apparatus reducing phase-noise included in the second RF signal by using the first RF signal, the method including: operating the second RF receiver and the phase-noise reduction apparatus and setting up a phase-noise filter, a phase shifter, and VGA amplifier, included in the phase-noise reduction apparatus, as a default value; determining whether bit error rate of a present frame from the second RF receiver is higher than a reference bit error rate and determining whether the bit error rate of the present frame is higher than a bit error rate of a previous frame when the bit error rate of the present frame is higher than the reference bit error rate; controlling a phase of the phase shifter and a gain of the VGA amplifier to be in a direction identical with a previous control direction when the bit error rate of the present frame is lower than the bit error rate of the previous frame and reducing a phase-noise signal included in the second RF signal by using a signal included in the first RF signal, whose phase is inverted; and controlling the phase of the phase shifter and the gain of the VGA amplifier to be in a direction opposite to the previous control direction when the bit error rate of the present frame is higher than the bit error rate of the previous frame and reducing the phase-noise signal included in the second RF signal by using the signal included in the first RF signal, whose phase is inverted.

According to yet another aspect of the present invention, there is provided a method of reducing interfering phase-noise, applied to a mobile terminal including a first RF transmitter/receiver transmitting and receiving a first RF signal via a first antenna, a second RF receiver receiving a second RF signal via a second antenna, and a phase-noise reduction apparatus reducing phase-noise included in the second RF signal by using the first RF signal, the method including: operating the second RF receiver and the phase-noise reduction apparatus and setting up a phase-noise filter, a phase shifter, and VGA amplifier, included in the phase-noise reduction apparatus, as a default value; controlling each main frequency of the phase-noise filter and the phase shifter by using channel information from the second RF receiver and reducing a phase-noise signal included in the second RF signal by using a signal included of the first RF signal, whose phase is inverted; operating the second RF receiver and the phase-noise reduction apparatus and setting up a phase-noise filter, a phase shifter, and VGA amplifier, included in the phase-noise reduction apparatus, as a default value; determining whether bit error rate of a present frame from the second RF receiver is higher than a reference bit error rate and determining whether the bit error rate of the present frame is higher than a bit error rate of a previous frame when the bit error rate of the present frame is higher than the reference bit error rate; controlling a phase of the phase shifter and a gain of the VGA amplifier to be in a direction identical with a previous control direction when the bit error rate of the present frame is lower than the bit error rate of the previous frame and reducing a phase-noise signal included in the second RF signal by using a signal included in the first RF signal, whose phase is inverted; and controlling the phase of the phase shifter and the gain of the VGA amplifier to be in a direction opposite to the previous control direction when the bit error rate of the present frame is higher than the bit error rate of the previous frame and reducing the phase-noise signal included in the second RF signal by using the signal included in the first RF signal, whose phase is inverted.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 4:
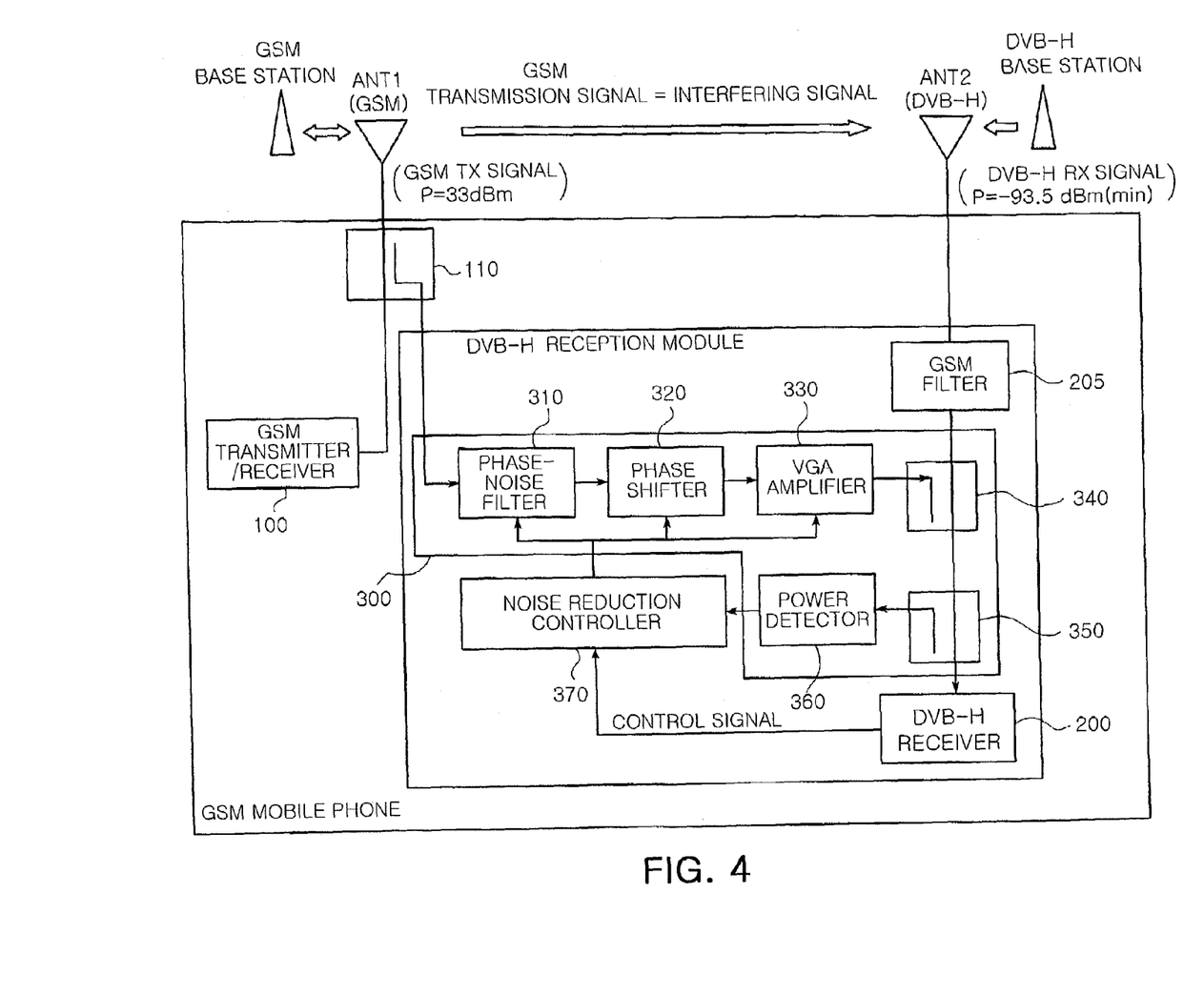
FIG. 4 is a configuration diagram illustrating a mobile terminal according to an exemplary embodiment of the present invention.

FIG. 4 is a configuration diagram of a mobile terminal according to an exemplary embodiment of the present invention. Referring to FIG. 4, the mobile terminal includes a GSM transmitter/receiver 100 transmitting and receiving a GSM signal via a first antenna ANT1, a first signal coupler 110 extracting a low power signal from a signal outputted from the GSM transmitter/receiver 100, a DVB-H receiver 200 receiving a DVB-H signal via a second antenna ANT2, and a phase-noise reduction apparatus 300 reducing a phase-noise signal of a GSM transmission signal included in a signal received via the second antenna ANT2 by inverting a phase of a phase-noise signal corresponding to a DVB-H receiving band from the low power signal extracted by the first signal coupler 110 and combining the phase-noise signal with the DVB-H signal received via the second antenna ANT2. In this case, the DVB-H receiver 200 may correspond to a second RF receiver, and the DVB-H signal may correspond to a second RF signal.

The mobile terminal may further include a GSM filter 205, in which the DVB-H signal and the phase-noise signal of the GSM transmission signal included in the signal received via the second antenna ANT2 are passed to the DVB-H receiver 200 and breaking the GSM transmission signal included in the signal received via the second antenna ANT2.

Figure 5:
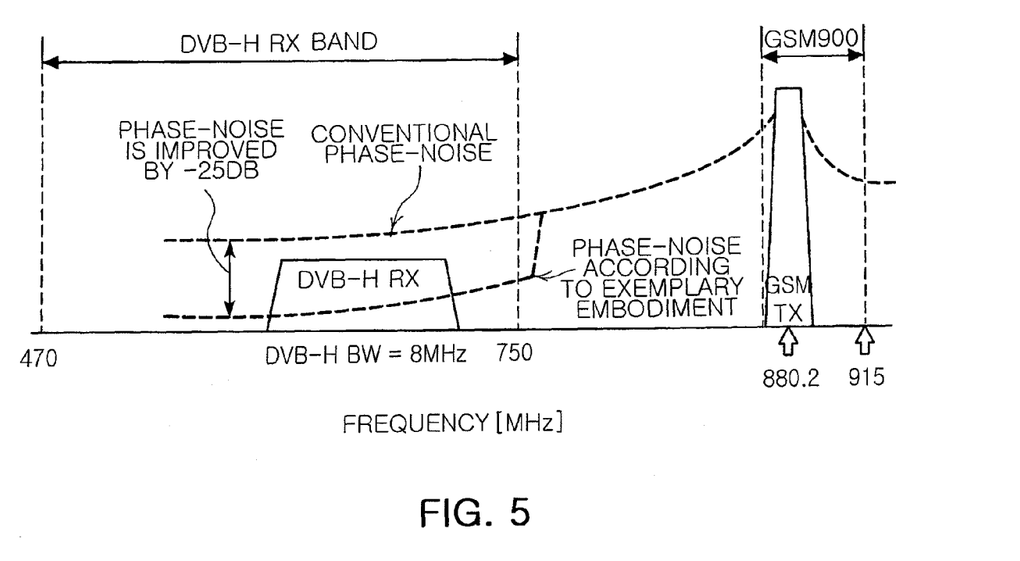
FIG. 5 is a diagram illustrating phase-noise reduction of the mobile terminal according to an exemplary embodiment of the present invention.

In this case, as described above, the band of the GSM transmission signal corresponds to approximately 880 to 915 MHz, the phase-noise of the GSM transmission signal is widely distributed in a band of 470 to 880 MHz, and the band of the DVB-H signal corresponds to 470 to 750 MHz (shown in FIG. 5).

The phase-noise reduction apparatus 300 includes a phase-noise filter 310 filtering the phase-noise signal corresponding to the DVB-H receiving band from the signal extracted by the first signal coupler 110, a phase shifter 320 inverting the phase of the phase-noise signal filtered from the phase-noise filter 310, a VGA amplifier 330 modulating a level of the signal from the phase shifter 320, and a signal combiner 340 reducing the phase-noise signal included in the received signal by combining the signal from the VGA amplifier 330 and the DVB-H signal from the second antenna ANT2.

The phase-noise reduction apparatus 300 may further include a noise reduction controller 370 controlling reduction of the phase-noise signal included in the DVB-H signal based on a control signal from the DVB-H receiver 200.

In this case, the noise reduction controller 370 may receive the control signal from the DVB-H receiver 200 and control variableness of main frequencies of the phase-noise filter 310 and the phase shifter 320 based on channel information included in the control signal.

The noise reduction controller 370 may receive the control signal from the DVB-H receiver 200 and control the variableness of the main frequency of the phase shifter 320 and gain of the VGA amplifier 330 based on a bit error rate (BER) of the control signal.

The noise reduction controller 370 may receive the control signal from the DVB-H receiver 200, control the variableness of the main frequencies of the phase-noise filter 310 and the phase shifter 320 and the gain of the VGA amplifier 330, and control power of the phase-noise signal included in the DVB-H signal to be decreased via the second antenna.

With the noise reduction controller 370, the phase-noise filter 310 may be formed of a variable filer setting up a pass band including a frequency of a selected channel of the second RF signal as the main frequency, under the control of the noise reduction controller 370.

The phase shifter 320 may set up a phase shift main frequency under the control of the noise reduction controller 370 and shift the phase of the phase-noise signal from the phase-noise filter 310 on the main frequency. In this case, there is a phase difference of 180 degrees between the inverted phase and the phase-noise signal received via the second antenna.

The VGA amplifier 330 may control a level of the signal from the phase shifter 320 to be identical with a level of the phase-noise signal of the first RF signal via the second antenna, according to the control of the noise reduction controller 370.

Also, the phase-noise reduction apparatus 300 may further include a second signal coupler 350 extracting a low power signal from a signal outputted from the signal combiner 340 and a power detector 360 detecting power of a phase-noise signal included in the signal extracted by the second signal coupler 350.

In this case, the VGA amplifier 330 amplifies and outputs the signal from the phase shifter 320 by a gain determined according to the power of the GSM phase-noise signal, detected by the power detector 360, to the signal combiner 340.

In this case, the noise reduction controller 370 may monitor the power of the GSM phase-noise signal from the power detector 360, modulate the phase of the phase shifter 320, control the gain of the VGA amplifier 330, and control the power of the GSM phase-noise signal to be reduced.

FIG. 5 is a diagram illustrating phase-noise reduction of a mobile terminal according to an exemplary embodiment of the present invention. Referring to FIG. 5, GSM900 is a frequency band of a GSM transmission signal and DVB-H RX is a DVB-H reception signal. Referring to FIG. 5, a bad effect on the DVB-H reception signal, caused by a phase-noise signal of the GSM transmission signal, is improved. Namely, the phase-noise of the GSM transmission signal is reduced by approximately 25 dB, thereby more clearly receiving DVB-H reception signal.

Figure 6:
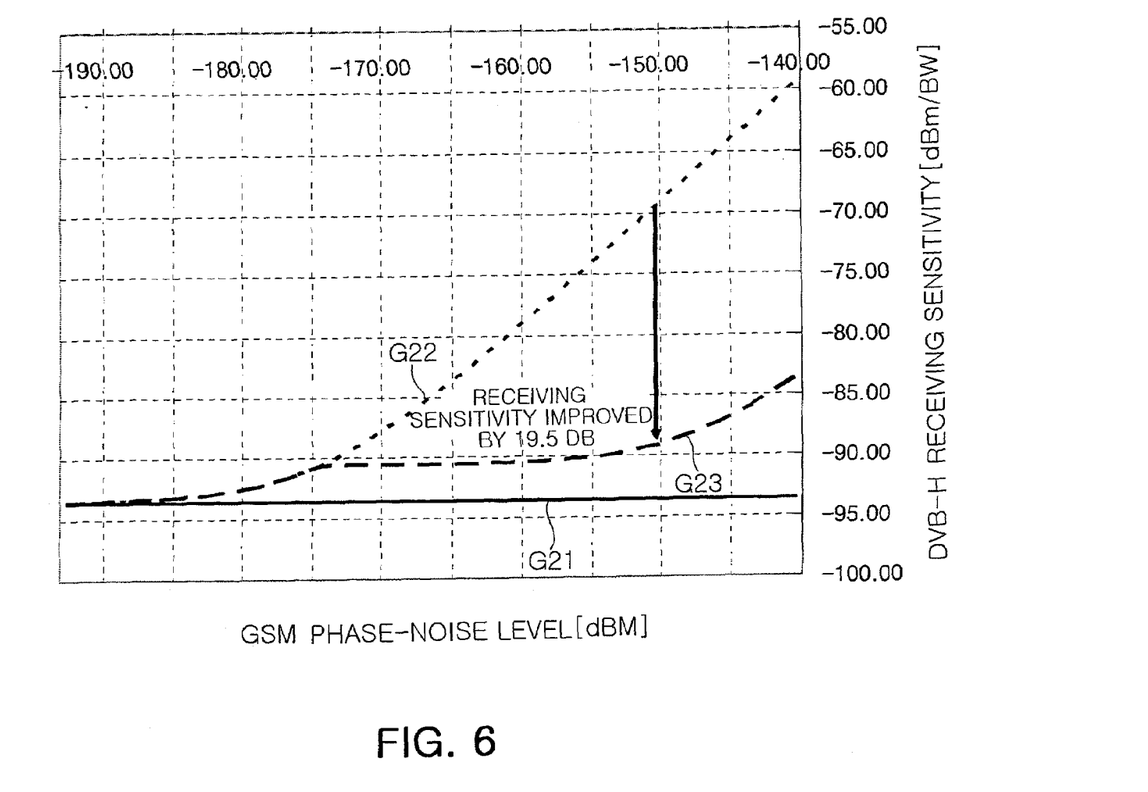
FIG. 6 is a measurement graph illustrating improvement of DVB-H receiving sensitivity against phase-noise when using a phase-noise reduction apparatus according to an exemplary embodiment of the present invention.

FIG. 6 is a measurement graph illustrating improvement of DVB-H receiving sensitivity against phase-noise when using a phase-noise reduction apparatus according to an exemplary embodiment of the present invention. Referring to FIG. 6, G21 is a graph illustrating natural DVB-H receiving sensitivity, G22 is a graph illustrating DVB-H receiving sensitivity when affected by phase-noise of a GSM signal, and G23 is a graph illustrating DVB-H receiving sensitivity improved by the phase-noise reduction apparatus.

Figure 7:
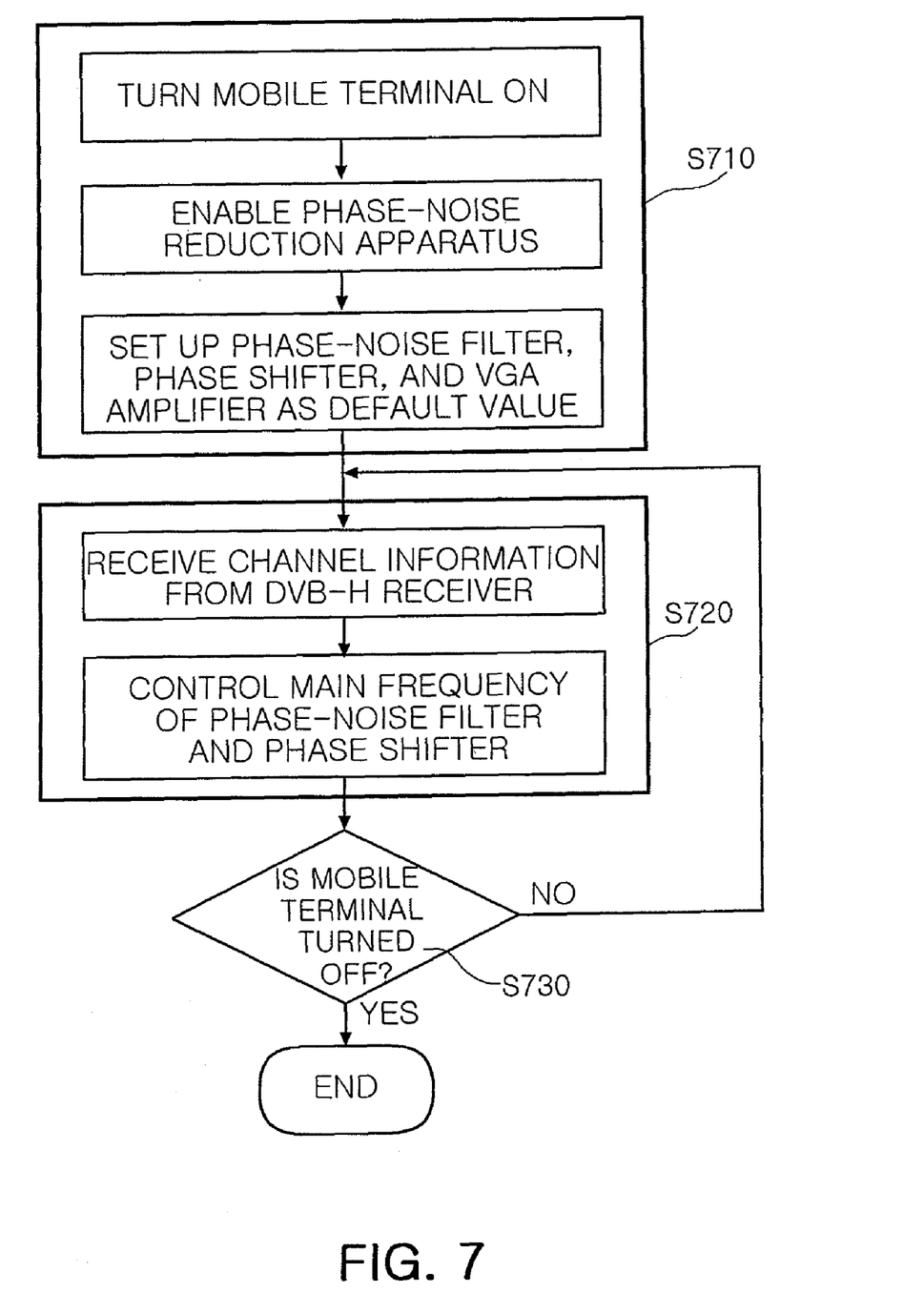
FIG. 7 is a flowchart illustrating operations of a method of reducing interfering phase-noise in the mobile terminal, according to an exemplary embodiment of the present invention.

FIG. 7 is a flowchart illustrating operations of a method of reducing interfering phase-noise in the mobile terminal, according to an exemplary embodiment of the present invention. Referring to FIG. 7, in operation S710, when power of the mobile terminal is turned on, the phase-noise reduction apparatus 300 is enabled and a main frequency of the phase-noise filter 310 and the phase shifter 320 and a gain of the VGA amplifier 330 are set up as a default value.

In operation S720, the phase-noise reduction apparatus 300 controls the main frequency of the phase-noise filter 310 and the phase shifter 320 based on channel information from the DVB-H receiver 200. In operation S730, operation S720 is repeated when the power of the mobile terminal is not turned off and the phase-noise reduction apparatus 300 finishes controlling the main frequency of the phase-noise filter 310 and the phase shifter 320 based on channel information from the DVB-H receiver 200 when the power of the mobile terminal is turned off.

Figure 8:
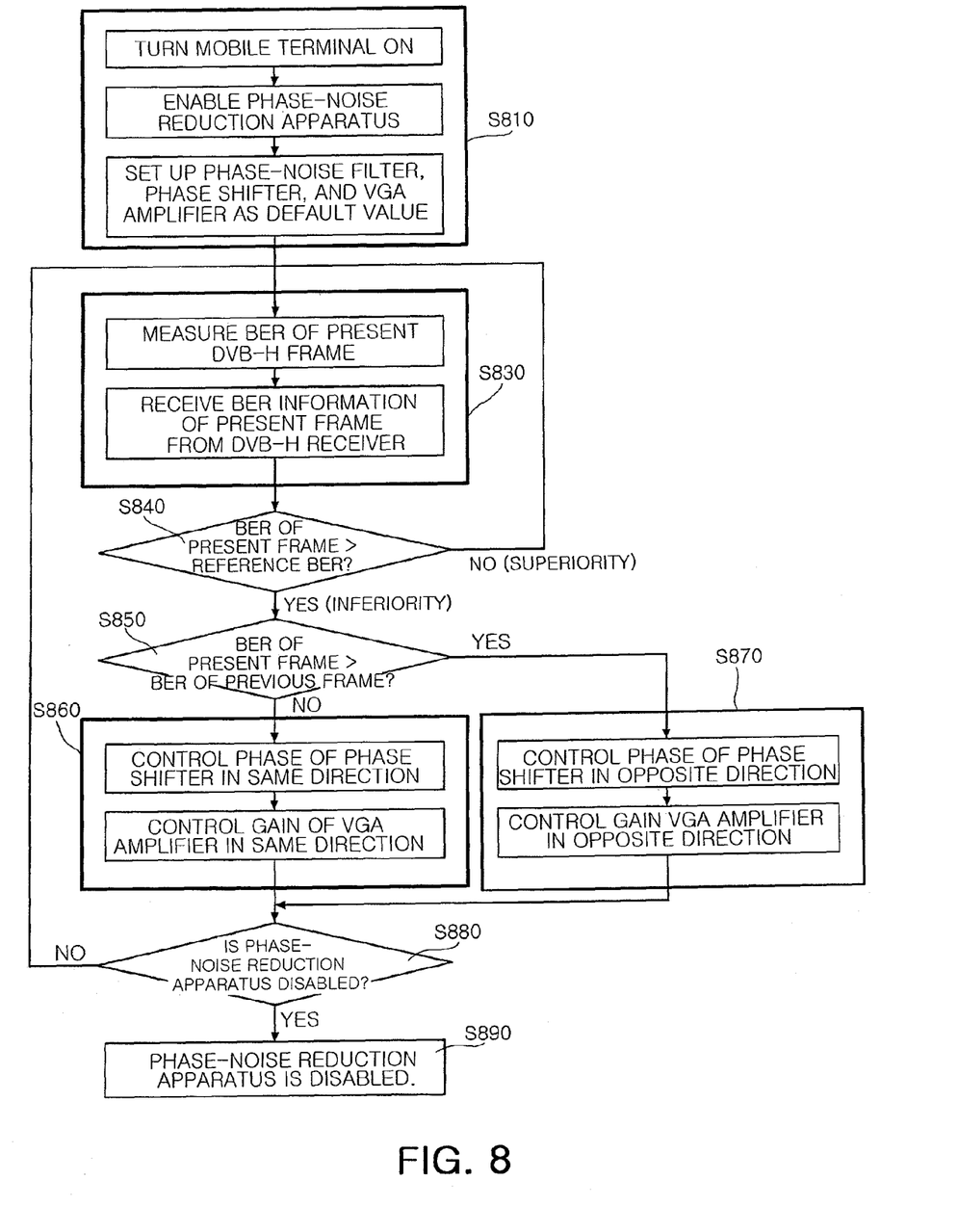
FIG. 8 is a flowchart illustrating operations of a method of reducing interfering phase-noise in the mobile terminal, according to an exemplary embodiment of the present invention.

FIG. 8 is a flowchart illustrating operations of a method of reducing interfering phase-noise in the mobile terminal, according to an exemplary embodiment of the present invention. Referring to FIG. 8, in operation S810, when power of the mobile terminal is turned on, the phase-noise reduction apparatus 300 is enabled and a main frequency of the phase-noise filter 310 and the phase shifter 320 and a gain of the VGA amplifier 330 are set up as a default value.

In operation S830, bit error rate (BER) information of a present frame is received from the DVB-H receiver 200. In operation S840, to determine superiority or inferiority with respect to the present frame, the BER information of the present frame is compared with a reference BER. When the BER of the present frame is not higher than the reference BER, operation S830 is repeated to measure a BER of a next frame.

In operation S850, when the BER of the present frame is higher than the reference BER, the BER of the present frame is compared with a BER of a previous frame. In operation S860, when the BER of the present frame is not higher than the BER of the previous frame, a phase of the phase shifter 320 and a gain of the VGA amplifier 330 are controlled to be in a direction identical with a previous control direction.

In operation S870, when the BER of the present frame is higher than the BER of the previous frame, the phase of the phase shifter 320 and the gain of the VGA amplifier 330 are controlled to be a direction opposite to the previous control direction. In operation S880, it is determined whether to disable the phase-noise reduction apparatus 300. In operation S890, when the phase-noise reduction apparatus 300 is determined to be disabled, the phase-noise reduction apparatus 300 is disabled.

Figure 9:
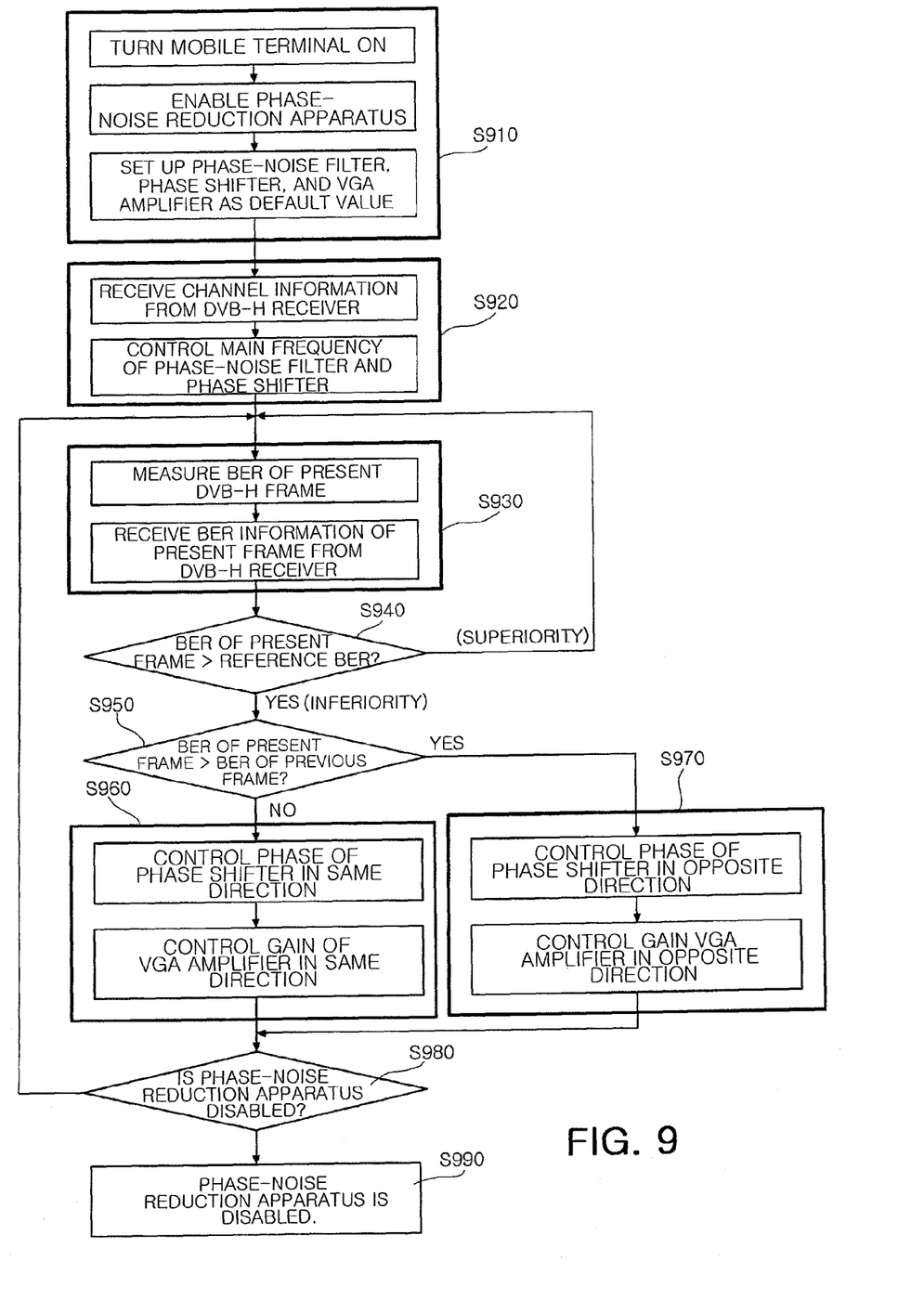
FIG. 9 is a flowchart illustrating operations of a method of reducing interfering phase-noise in the mobile terminal, according to an exemplary embodiment of the present invention.

FIG. 9 is a flowchart illustrating operations of a method of reducing interfering phase-noise in the mobile terminal, according to an exemplary embodiment of the present invention. Referring to FIG. 9, in operation S910, when power of the mobile terminal is turned on, the phase-noise reduction apparatus is enabled and the phase-noise reduction apparatus 300 is enabled and a main frequency of the phase-noise filter 310 and the phase shifter 320 and a gain of the VGA amplifier 330 are set up as a default value.

In operation S920, the phase-noise reduction apparatus 300 controls the main frequency of the phase-noise filter 310 and the phase shifter 320 based on channel information from the DVB-H receiver 200.

In operation S930, BER information of a present frame is received from the DVB-H receiver 200.

In operation S940, to determine superiority or inferiority with respect to the present frame, the BER information of the present frame is compared with a reference BER. When the BER of the present frame is not higher than the reference BER, operation S830 is repeated to measure a BER of a next frame.

In operation S950, when the BER of the present frame is higher than the reference BER, the BER of the present frame is compared with a BER of a previous frame.

In operation S960, when the BER of the present frame is not higher than the BER of the previous frame, a phase of the phase shifter 320 and a gain of the VGA amplifier 330 are controlled to be in a direction identical with a previous control direction.

In operation S970, when the BER of the present frame is higher than the BER of the previous frame, the phase of the phase shifter 320 and the gain of the VGA amplifier 330 are controlled to be a direction opposite to the previous control direction.

In operation S980, it is determined whether to disable the phase-noise reduction apparatus 300. In operation S890, when the phase-noise reduction apparatus 300 is determined to be disabled, the phase-noise reduction apparatus 300 is disabled.

Hereinafter, effects of the present invention will be described referring to attached drawings. In the mobile terminal according to an exemplary embodiment of the present invention, a GSM transmitter/receiver of 880 to 915 MHz and a DVB-H receiver of 470 to 750 MHz are built. The mobile terminal will be described referring to FIGS. 4 through 9.

Referring to FIG. 4, in a GSM mobile terminal according to an exemplary embodiment of the present invention, the GSM transmitter/receiver 100 transmits a GSM signal included in a frequency band of approximately 880 to 915 MHz via the first antenna ANT1 and the DVB-H receiver 200 receives a DVB-H signal included in a frequency band of approximately 470 to 750 MHz via the second antenna ANT2.

In this case, the GSM mobile terminal includes the GSM filter 205 between the second antenna ANT2 and the DVB-H receiver 200 capable of allowing a DVB-H signal included in a signal received from the second antenna ANT2 to be sent to the DVB-H receiver 200 and breaking the GSM transmission signal included in the received signal.

Though the GSM filter 205 may break the GSM transmission signal, a phase-noise component of the GSM transmission signal is not perfectly broken and the phase-noise of the GSM transmission signal is applied as it is to the DVB-H receiver 200. When using the GSM filter 205 together with the phase-noise reduction apparatus 300, the phase-noise of the GSM signal may be efficiently reduced together with the GSM transmission signal. This will be described.

The first signal coupler 110 distributes a part of a signal outputted from the GSM transmitter/receiver 100 to the phase-noise reduction apparatus 300.

The phase-noise reduction apparatus 300 inverts a phase of a phase-noise signal corresponding to a DVB-H reception band from the signal extracted by the first signal coupler 110 to combine with the signal received from the second antenna ANT2 and reduce the phase-noise signal of the GSM transmission signal, included in the signal received from the second antenna ANT2.

Hereinafter, the phase-noise reduction apparatus 300 will be described in detail referring to FIGS. 4 through 9.

Referring to FIGS. 4 and 5, the phase-noise filter 310 of the phase-noise reduction apparatus 300 allows the phase-noise signal corresponding to the DVB-H reception band from the signal extracted by the first signal coupler 110 to be sent to the phase shifter 320.

The phase shifter 320 inverts and outputs the phase of the phase-noise signal from the phase-noise filter 310, to the VGA amplifier 330.

The VGA amplifier 330 amplifies and outputs the signal from the phase shifter 320, to the signal combiner 340.

The signal combiner 340 combines the signal from the VGA amplifier 330 with the signal received via the second antenna ANT2 and reduces the phase-noise signal included in the signal received via the second antenna ANT2.

Also, when the phase-noise reduction apparatus 300 further includes the noise reduction controller 370, the noise reduction controller 370 controls reduction of the phase-noise signal included in the second RF signal, based on a control signal from the DVB-H receiver 200.

For example, the noise reduction controller 370 may receive the control signal from the DVB-H receiver 200 and control variableness of a main frequency of the phase-noise filter 310 and the phase shifter 320 based on channel information included in the control signal.

In this case, the phase-noise filter 310 is formed of a variable filter, sets up a pass band including a frequency of a selected channel of the second RF signal as a main frequency, under to the control of the noise reduction controller 370, and allows the signal extracted by the first signal coupler 110 to pass the pass band. Also, the phase shifter 320 sets up a main frequency of phase shift and inverts a phase of the phase-noise signal from the phase-noise filter 310, on the main frequency, under the control of the noise reduction controller 370. In this case, there is a phase difference of 180 degrees between the inverted phase and the phase-noise signal received via the second antenna ANT2.

For example, the noise reduction controller 370 may receive a control signal from the DVB-H receiver 200 and control the variableness of the main frequency of the phase shifter 320 and a gain of the VGA amplifier 330 based on a BER of the control signal.

In this case, the phase shifter 320 sets up a main frequency of phase shift and inverts a phase of the phase-noise signal from the phase-noise filter 310, on the main frequency, under the control of the noise reduction controller 370. In this case, as described above, there is a phase difference of 180 degrees between the inverted phase and the phase-noise signal received via the second antenna ANT2. The VGA amplifier 330 controls a level of the signal from the phase shifter 320 to be identical with a level of the first RF signal via the second antenna under the control of the noise reduction controller 370.

For example, the noise reduction controller 370 receives a control signal from the DVB-H receiver 200, controls variableness of a main frequency of the phase-noise filter 310 and the phase shifter 320 and a gain of the VGA amplifier, and controls power of a phase-noise signal of a first RF signal via the second antenna ANT2.

In this case, as described above, the phase-noise filter 310 is formed of a variable filter capable of setting up a pass band including a frequency of a selected channel of the second RF signal as a main frequency, more precisely selecting a phase-noise signal corresponding to a DVB-H reception band from a GSM transmission signal coupled by the first signal coupler 110, and outputting the selected phase-noise signal to the phase shifter 320.

Also, the phase shifter 320 sets up a main frequency of phase shift and inverts a phase of the phase-noise signal from the phase-noise filter 310, on the main frequency, under the control of the noise reduction controller 370. In this case, there is a phase difference of 180 degrees between the inverted phase and the phase-noise signal received via the second antenna ANT2.

The VGA amplifier 330 controls a level of the signal from the phase shifter 320 to be identical with a level of the first RF signal via the second antenna under the control of the noise reduction controller 370.

On the other hand, when the phase-noise reduction apparatus 300 includes the second signal coupler 350 and the power detector 360, the second signal coupler 350 distributes a signal outputted from the signal combiner 340 to the power detector 360. In this case, the power detector 360 may detect and output power of a phase-noise signal included in the signal extracted by the second signal coupler 350, to the noise reduction controller 370.

In this case, the noise reduction controller 370 may monitor power of a GSM phase-noise signal from the power detector 360 and control the phase shifter 320 and the VGA amplifier 330 to reduce the power of the phase-noise signal.

Also, the noise reduction controller 370 may monitor DVB-H reception channel information outputted from the DVB-H receiver 200, BER information indicating receiving sensitivity, and a level of the power of the phase-noise signal outputted from the power detector 360 and control the phase-noise filter 310, the phase shifter 320, and the VGA amplifier 330 to improve performance, in order to reduce an effect of the GSM phase-noise.

As described above, according to an exemplary embodiment of the present invention, as shown in FIG. 6, phase-noise characteristic due to a GSM signal is improved. Referring to FIG. 6, when phase-noise of a GSM transmission signal is −150 dBm/Hz, DVB-H receiving sensitivity lowered to −69.5 dBm in a conventional terminal as shown in G21 is improved to −89.5 dBm by the phase-noise reduction apparatus 300 as shown in G23.

On the other hand, the phase-noise reduction method according to an exemplary embodiment of the present invention will be described in detail referring to FIGS. 7 through 9.

The phase-noise reduction method is applied to a mobile terminal including a first RF transmitter/receiver transmitting and receiving a first RF signal via a first antenna, a second RF receiver receiving a second RF signal via a second antenna, and a phase-noise reduction apparatus reducing phase-noise included in the second RF signal by using the first RF signal.

Referring to FIG. 7, the phase-noise reduction method according to an exemplary embodiment of the present invention will be described. Referring to FIGS. 4 and 7, when the mobile terminal is turned on, the phase-noise reduction apparatus 300 is enabled, a main frequency of the phase-noise filter 310 and phase shifter 320 included in the phase-noise reduction apparatus 300 and a gain of the VGA amplifier 330 are set up as a default value (S710).

The phase-noise reduction apparatus 300 controls the main frequency of the phase-noise filter 310 and the phase shifter 320 based on channel information from the DVB-H receiver 200 (S720). In this case, the phase-noise filter 310 selects a phase-noise signal corresponding to the DVB-H reception band from a GSM signal via the first antenna ANT1 and a signal whose phase is inverted by the phase shifter 320 is amplified by the VGA amplifier 330 and combined with a signal received via the second antenna ANT2, thereby reducing phase-noise included in the received signal.

Operation S720 is repeated when the power of the mobile terminal is not turned off and is finished when the power of the mobile terminal is turned off (S730).

Referring to FIG. 8, the phase-noise reduction method according to an exemplary embodiment of the present invention will be described. Referring to FIGS. 4 and 8, as described above, when power of the mobile terminal is turned on, the phase-noise reduction apparatus 300 is enabled and a main frequency of the phase-noise filter 310 and the phase shifter 320 and a gain of the VGA amplifier 330 are set up as a default value (S810).

The phase-noise reduction apparatus 300 receives BER information of a present frame from the DVB-H receiver 200 (S830). In this case, the DVB-H receiver 200 measures a BER of the present frame and provides the BER information of the present frame to the phase-noise reduction apparatus 300.

To determine superiority or inferiority with respect to the present frame, the phase-noise reduction apparatus 300 compares the BER information of the present frame with a reference BER (S840). In this case, the reference BER is previously determined. When the BER of the present frame is higher than the reference BER, the phase-noise reduction apparatus 300 compares the BER of the present frame with a BER of a previous frame to determine a control direction with respect to the present frame (S850). When the BER of the present frame is not higher than the reference BER, the operation of S830 of receiving BER information of a next frame is performed.

When the BER of the present frame is not higher than the BER of the previous frame, the phase-noise reduction apparatus 300 determines a present control direction to be right and controls a phase of the phase shifter 320 and a gain of the VGA amplifier 330 to be identical with a previous control direction (S860). When the BER of the present frame is higher than the BER of the previous frame, the phase-noise reduction apparatus 300 determines the present control direction to be not right and controls the phase of the phase shifter 320 and the gain of the VGA amplifier 330 to be opposite to the previous control direction (S870).

In this case, the phase-noise filter 310 selects the phase-noise signal corresponding to the DVB-H reception band from the GSM signal via the first antenna ANT1 and the signal whose phase is inverted by the phase shifter 320 is amplified by the VGA amplifier 330 and combined with a signal received via the second antenna ANT2, thereby reducing phase-noise included in the received signal.

The phase-noise reduction apparatus 300 performs the operation of S830 of receiving BER information of a next frame when it is not selected to disable the phase-noise reduction apparatus 300. When it is selected to disable the phase-noise reduction apparatus 300, the phase-noise reduction apparatus 300 is disabled (S880 and S890).

Referring to FIG. 9, the phase-noise reduction method according to an exemplary embodiment of the present invention will be described.

Referring to FIGS. 4 and 9, as described above, when power of the mobile terminal is turned on, the phase-noise reduction apparatus is enabled and the phase-noise reduction apparatus 300 is enabled and a main frequency of the phase-noise filter 310 and the phase shifter 320 and a gain of the VGA amplifier 330 are set up as a default value (S910).

The phase-noise reduction apparatus 300 controls the main frequency of the phase-noise filter 310 and the phase shifter 320 based on channel information from the DVB-H receiver 200 (S920).

In this case, the phase-noise filter 310 selects a phase-noise signal corresponding to the DVB-H reception band from a GSM signal via the first antenna ANT1 and a signal whose phase is inverted by the phase shifter 320 is amplified by the VGA amplifier 330 and combined with a signal received via the second antenna ANT2, thereby reducing phase-noise included in the received signal.

The phase-noise reduction apparatus 300 receives BER information of a present frame from the DVB-H receiver 200 (S930). In this case, the DVB-H receiver 200 measures a BER of the present frame and provides the BER information of the present frame to the phase-noise reduction apparatus 300.

To determine superiority or inferiority with respect to the present frame, the phase-noise reduction apparatus 300 compares the BER information of the present frame with a reference BER (S940). In this case, the reference BER is previously determined. When the BER of the present frame is higher than the reference BER, the phase-noise reduction apparatus 300 compares the BER of the present frame with a BER of a previous frame to determine a control direction with respect to the present frame (S950). When the BER of the present frame is not higher than the reference BER, the operation of S930 of receiving BER information of a next frame is performed.

When the BER of the present frame is not higher than the BER of the previous frame, the phase-noise reduction apparatus 300 determines a present control direction to be right and controls a phase of the phase shifter 320 and a gain of the VGA amplifier 330 to be identical with a previous control direction (S960).

When the BER of the present frame is higher than the BER of the previous frame, the phase-noise reduction apparatus 300 determines the present control direction to be not right and controls the phase of the phase shifter 320 and the gain of the VGA amplifier 330 to be opposite to the previous control direction (S970).

In this case, the phase-noise filter 310 selects the phase-noise signal corresponding to the DVB-H reception band from the GSM signal via the first antenna ANT1 and the signal whose phase is inverted by the phase shifter 320 is amplified by the VGA amplifier 330 and combined with a signal received via the second antenna ANT2, thereby reducing phase-noise included in the received signal. The phase-noise reduction apparatus 300 performs the operation of S930 of receiving BER information of a next frame when it is not selected to disable the phase-noise reduction apparatus 300. When it is selected to disable the phase-noise reduction apparatus 300, the phase-noise reduction apparatus 300 is disabled (S980 and S990).

As described above, in the GSM mobile terminal according to an exemplary embodiment of the present invention, reduction of GSM phase-noise included in a received signal may be controlled based on a previously determined receiving channel from a DVB-H reception band via a control signal of a DVB-H receiver 200. Particularly, the noise reduction controller 370 may monitor BER information of the DVB-H receiver 200 and power of a GSM phase-noise signal from the power detector 360, modulate a phase of the phase shifter 320, control a gain of the VGA amplifier 330, and control the power of the GSM phase-noise signal to be reduced.

As described above, according to an exemplary embodiment of the present invention, when receiving digital TV broadcasting such as DVB-H, a phase-noise signal due to a high power transmission signal of a mobile phone such as GSM is broken, thereby preventing deterioration of sensitivity of receiving digital TV broadcasting, caused by a phase-noise signal of a high power GSM signal, and improving performance of receiving digital TV broadcasting such as DVB-H and mass-productivity.

In detail, according to an exemplary embodiment of the present invention, a phase-noise component of a GSM transmission signal applied to a DVB-H reception band is reduced, thereby improving the reception performance of the DVB-H receiver under a GSM communication environment, as shown in FIG. 7. Also, when performing GSM communication, digital broadcasting may be stably received via the DVB-H receiver.

Also, an effect of GSM phase-noise in the DVB-H reception band is reduced, thereby expanding the entire of the DVB-H reception band more than 750 MHz to enable frequency expansion.

While the present invention has been shown and described in connection with the exemplary embodiments, it will be apparent to those skilled in the art that modifications and variations can be made without departing from the spirit and scope of the invention as defined by the appended claims.

What is claimed is:

1. A mobile terminal comprising:
a first radio frequency transmitter/receiver for transmitting and receiving a first radio frequency signal via a first antenna;
a first signal coupler extracting a low power signal from a signal outputted from the first transmitter/receiver;
a second radio frequency receiver receiving a second radio frequency signal via a second antenna;
a phase-noise filter through which a phase-noise signal of the first radio frequency signal corresponding to a second radio frequency receiving band from the signals extracted by the first signal coupler;
a phase shifter for inverting a phase of the phase-noise signal of the first radio frequency signal from the phase-noise filter;
a variable gain amplifier modulating a level of a signal from the phase shifter; and
a signal combiner combining a signal from the variable gain amplifier with the second radio frequency signal from the second antenna and reducing the phase-noise signal of the first radio frequency signal included in the second radio frequency signal; and
a noise reduction controller controlling reduction of the phase-noise signal included in the second radio frequency signal based on a control signal from the second radio frequency receiver, wherein the noise reduction controller receives the control signal from the second radio frequency receiver and controls variableness of main frequencies of the phase-noise filter and the phase shifter based on channel information included in the control signal.

2. The mobile terminal of claim 1, wherein the phase-noise filter is formed of a variable filter setting up a pass band including a frequency of a selected channel of the second radio frequency signal as a main frequency under the control of the noise reduction controller.

3. The mobile terminal of claim 1, wherein the phase shifter sets up a main frequency of phase shift and inverts a phase of the phase-noise signal from the phase-noise filter on the set main frequency under the control of the noise reduction controller, in which there is a phase difference of 180 degrees between the inverted phase and the phase-noise signal received via the second antenna.

4. A mobile terminal comprising:
a first radio frequency transmitter/receiver for transmitting and receiving a first radio frequency signal via a first antenna;
a first signal coupler extracting a low power signal from a signal outputted from the first transmitter/receiver;
a second radio frequency receiver receiving a second radio frequency signal via a second antenna;
a phase-noise filter through which a phase-noise signal of the first radio frequency signal corresponding to a second radio frequency receiving band from the signals extracted by the first signal coupler;
a phase shifter for inverting a phase of the phase-noise signal of the first radio frequency signal from the phase-noise filter;
a variable gain amplifier modulating a level of a signal from the phase shifter; and
a signal combiner combining a signal from the variable gain amplifier with the second radio frequency signal from the second antenna and reducing the phase-noise signal of the first radio frequency signal included in the second radio frequency signal; and
a noise reduction controller controlling reduction of the phase-noise signal included in the second radio frequency signal based on a control signal from the second radio frequency receiver, wherein the noise reduction controller receives a control signal from the second radio frequency receiver and controls variableness of a main frequency of the phase shifter and a gain of the variable gain amplifier based on bit error rate of the control signal.

5. The mobile terminal of claim 4, wherein the phase shifter sets up a main frequency of phase shift and inverts a phase of the phase-noise signal from the phase-noise filter on the set main frequency under the control of the noise reduction controller, in which there is a phase difference of 180 degrees between the inverted phase and the phase-noise signal received via the second antenna.

6. The mobile terminal of claim 4, wherein the variable gain amplifier controls a level of a signal from the phase shifter to be identical with a level of the phase-noise signal of the first radio frequency signal via the second antenna.

7. A mobile terminal comprising:
a first radio frequency transmitter/receiver for transmitting and receiving a first radio frequency signal via a first antenna;
a first signal coupler extracting a low power signal from a signal outputted from the first transmitter/receiver;
a second radio frequency receiver receiving a second radio frequency signal via a second antenna;
a phase-noise filter through which a phase-noise signal of the first radio frequency signal corresponding to a second radio frequency receiving band from the signals extracted by the first signal coupler;
a phase shifter for inverting a phase of the phase-noise signal of the first radio frequency signal from the phase-noise filter;
a variable gain amplifier modulating a level of a signal from the phase shifter; and
a signal combiner combining a signal from the variable gain amplifier with the second radio frequency signal from the second antenna and reducing the phase-noise signal of the first radio frequency signal included in the second radio frequency signal; and
a noise reduction controller controlling reduction of the phase-noise signal included in the second radio frequency signal based on a control signal from the second radio frequency receiver, wherein the noise reduction controller receives the control signal from the second radio frequency receiver, controls variableness of main frequencies of the phase-noise filter and the phase shifter and a gain of the variable gain amplifier based on channel information and bit error rate of the control signal, and controls power of the phase-noise signal of the first radio frequency signal via the second antenna to be decreased.

8. The mobile terminal of claim 7, wherein the phase-noise filter is formed of a variable filter setting up a pass band including a frequency of a selected channel of the second radio frequency signal as a main frequency under the control of the noise reduction controller.

9. The mobile terminal of claim 7, wherein the phase shifter sets up a main frequency of phase shift and inverts a phase of the phase-noise signal from the phase-noise filter on the set main frequency under the control of the noise reduction controller, in which there is a phase difference of 180 degrees between the inverted phase and the phase-noise signal received via the second antenna.

10. The mobile terminal of claim 7, wherein the variable gain amplifier controls a level of a signal from the phase shifter to be identical with a level of the phase-noise signal of the first radio frequency signal via the second antenna under the control of the noise reduction controller.

11. A method of reducing interfering phase-noise, applied to a mobile terminal including a first radio frequency transmitter/receiver transmitting and receiving a first radio frequency signal via a first antenna, a second radio frequency receiver receiving a second radio frequency signal via a second antenna, and a phase-noise reduction apparatus reducing phase-noise included in the second radio frequency signal by using the first radio frequency signal, the method comprising:
operating the second radio frequency receiver and the phase-noise reduction apparatus and setting up a phase-noise filter, a phase shifter, and variable gain amplifier, included in the phase-noise reduction apparatus, as a default value;
determining whether bit error rate of a present frame from the second radio frequency receiver is higher than a reference bit error rate and determining whether the bit error rate of the present frame is higher than a bit error rate of a previous frame when the bit error rate of the present frame is higher than the reference bit error rate;
controlling a phase of the phase shifter and a gain of the variable gain amplifier to be in a direction identical with a previous control direction when the bit error rate of the present frame is lower than the bit error rate of the previous frame and reducing a phase-noise signal included in the second radio frequency signal by using a signal included in the first radio frequency signal, whose phase is inverted; and
controlling the phase of the phase shifter and the gain of the variable gain amplifier to be in a direction opposite to the previous control direction when the bit error rate of the present frame is higher than the bit error rate of the previous frame and reducing the phase-noise signal included in the second radio frequency signal by using the signal included in the first radio frequency signal, whose phase is inverted.

12. A method of reducing interfering phase-noise, applied to a mobile terminal including a first radio frequency transmitter/receiver transmitting and receiving a first radio frequency signal via a first antenna, a second radio frequency receiver receiving a second radio frequency signal via a second antenna, and a phase-noise reduction apparatus reducing phase-noise included in the second radio frequency signal by using the first radio frequency signal, the method comprising:
operating the second radio frequency receiver and the phase-noise reduction apparatus and setting up a phase-noise filter, a phase shifter, and variable gain amplifier, included in the phase-noise reduction apparatus, as a default value;
controlling each main frequency of the phase-noise filter and the phase shifter by using channel information from the second radio frequency receiver and reducing a phase-noise signal included in the second radio frequency signal by using a signal included of the first radio frequency signal, whose phase is inverted;
determining whether bit error rate of a present frame from the second radio frequency receiver is higher than a reference bit error rate and determining whether the bit error rate of the present frame is higher than a bit error rate of a previous frame when the bit error rate of the present frame is higher than the reference bit error rate;
controlling a phase of the phase shifter and a gain of the variable gain amplifier to be in a direction identical with a previous control direction when the bit error rate of the present frame is lower than the bit error rate of the previous frame and reducing a phase-noise signal included in the second radio frequency signal by using a signal included in the first radio frequency signal, whose phase is inverted; and
controlling the phase of the phase shifter and the gain of the variable gain amplifier to be in a direction opposite to the previous control direction when the bit error rate of the present frame is higher than the bit error rate of the previous frame and reducing the phase-noise signal included in the second radio frequency signal by using the signal included in the first radio frequency signal, whose phase is inverted.

* * * * *